R. L. DAILEY.
VARIABLE SPEED TRANSMISSION GEARING.
APPLICATION FILED APR. 22, 1918.

1,317,272.

Patented Sept. 30, 1919.
2 SHEETS—SHEET 1.

INVENTOR
R. L. Dailey,
BY
George H. Thorpe
ATTORNEY

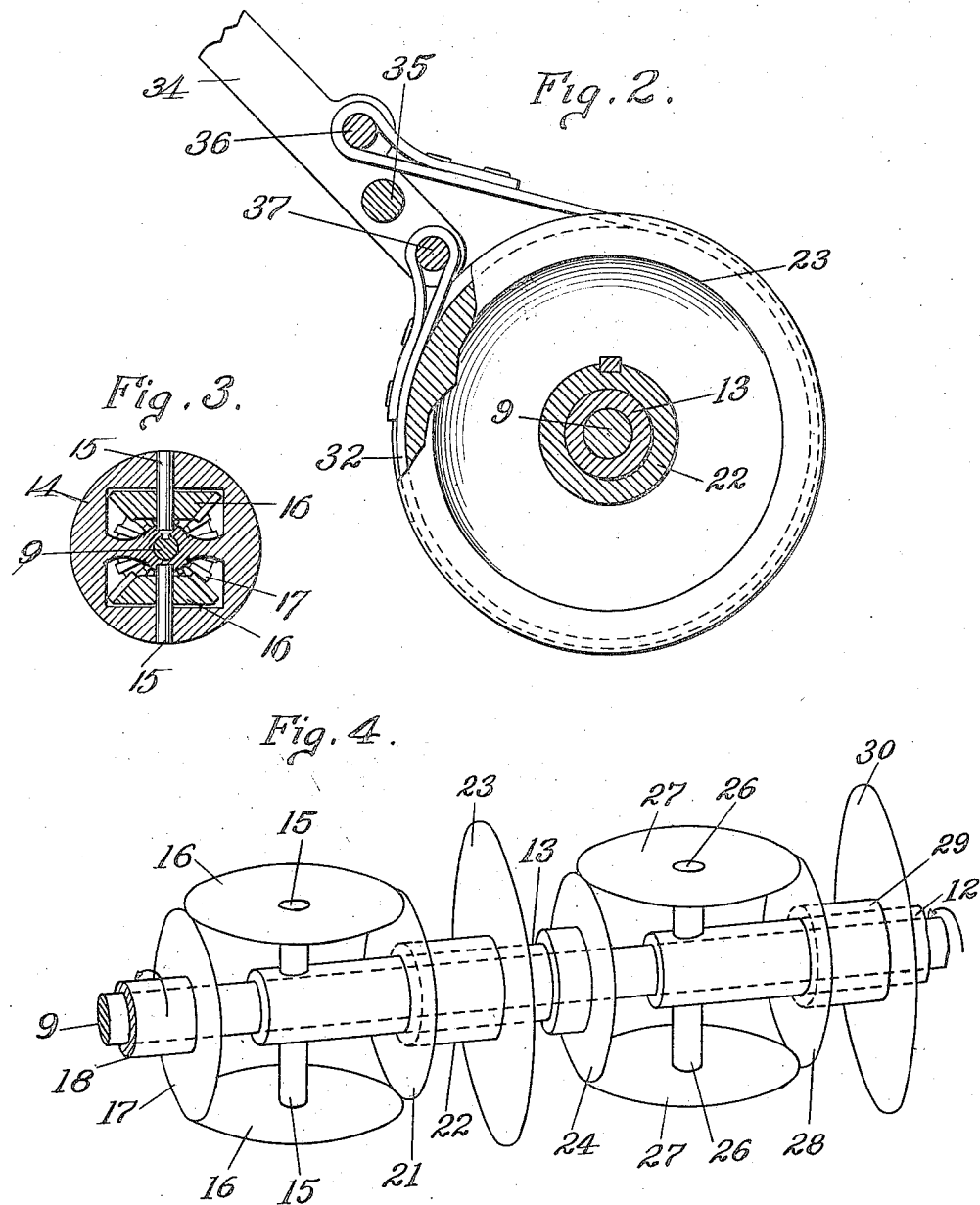

UNITED STATES PATENT OFFICE.

RUSSELL L. DAILEY, OF KANSAS CITY, MISSOURI.

VARIABLE-SPEED-TRANSMISSION GEARING.

1,317,272.　　　　　　Specification of Letters Patent.　　Patented Sept. 30, 1919.

Application filed April 22, 1918. Serial No. 229,954.

*To all whom it may concern:*

Be it known that I, RUSSELL L. DAILEY, a citizen of the United States, residing at Kansas City, in the county of Jackson and State of Missouri, have invented certain new and useful Improvements in Variable-Speed-Transmission Gearing, of which the following is a specification.

This invention relates to variable speed power transmission gearing, and has for its object to produce a mechanism of this character whereby the speed of a driven element may be gradually increased or diminished without affecting the action of the driving element, mechanism of the character set forth being particularly desirable in motor cars as it will permit the drivers to "pick up" speed as slowly or gradually as desired and without any attendant jerk or jump so common where the speed of the driving element or motor remains unchanged but the clutch of the car is shifted from its position for one speed into position for a higher speed, and particularly when the car is started.

With the object named in view, the invention consists in certain novel and useful features of construction and combinations of parts as hereinafter described and claimed; and in order that the invention may be fully understood reference is to be had to the accompanying drawing, in which:

Fig. 2, is a cross section taken adjacent one of the speed-accelerating wheels and the friction-band mechanism for controlling said wheel.

Fig. 3, is a cross section on a reduced scale, to disclose the type of ring mounted to rotate respectively, with its shaft.

Fig. 4, is a diagrammatic perspective view of the gearing to facilitate understanding of the operation of the gearing under all conditions.

Figure 1:
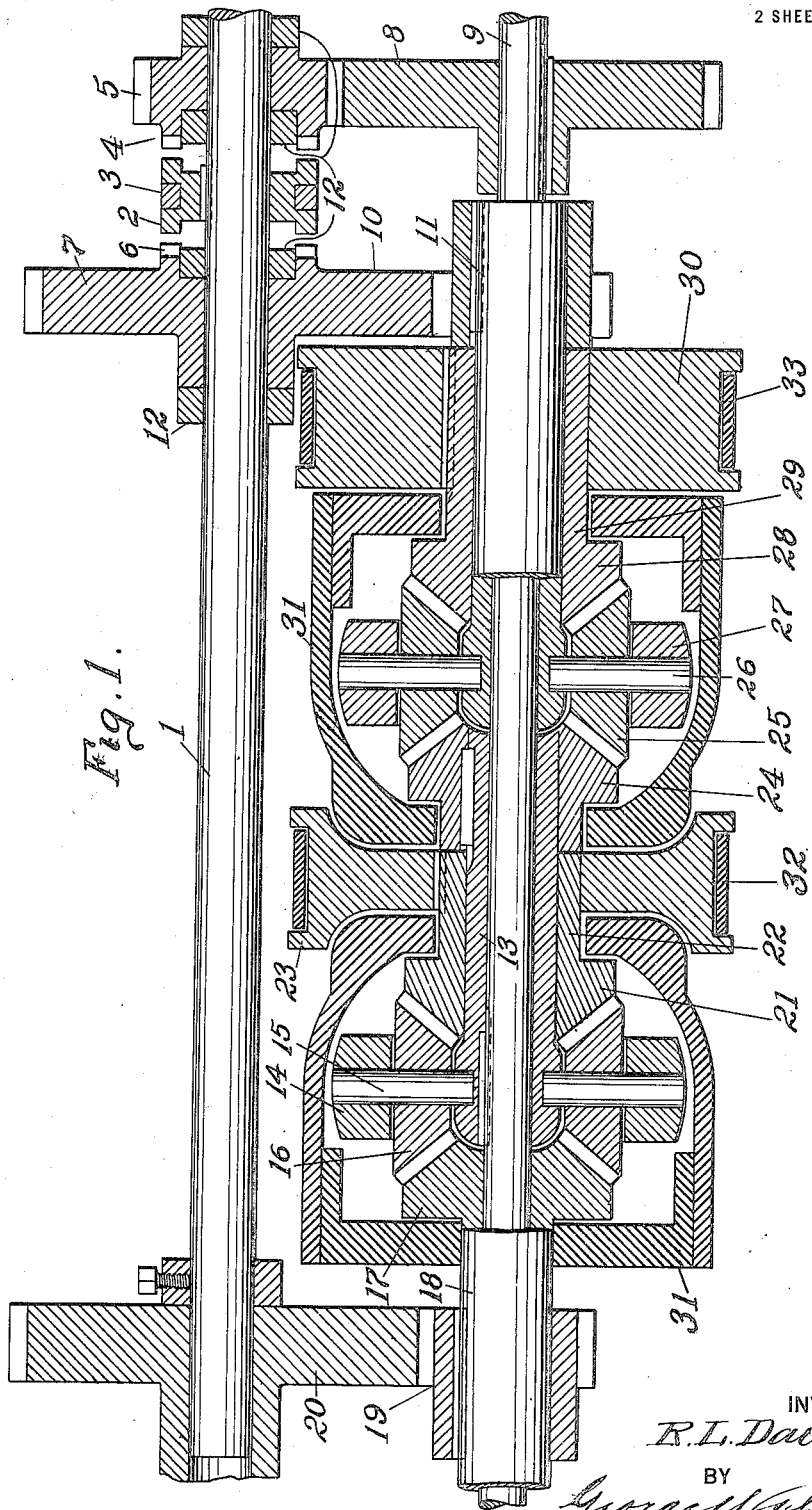
Figure 1, is a central longitudinal section of a speed transmission gearing embodying my invention.

In the said drawing where like parts are correspondingly numbered in all of the figures, 1 indicates the driving element, the shaft of an internal combustion engine, for example, 2 is a clutch-member slidable on and rotatable with said shaft, and shiftable through the medium of the customary collar 3, journaled on the clutch-member and connected to a lever, not shown, the adjustment of the clutch-member in one direction causing it to engage and operate clutch-member 4 of wheel 5, journaled on the shaft 1, and in the opposite direction causing it to engage and operate the large gear wheel 7 journaled on said shaft, by means of the clutch-member 6 of said wheel.

Wheel 5 is intergeared with a gear wheel 8 keyed on a shaft 9 suitably journaled and shown as paralleling shaft 1, and wheel 7 is intergeared with a gear wheel 10 keyed on a sleeve or tubular shaft 11, journaled on shaft 9, it being noted that the loose wheels 5 and 7, are confined on shaft 1 between collars 12 secured upon said shaft.

Keyed upon shaft 9 is a sleeve-shaft 13 equipped with a ring 14 having opposite openings crossed by radially extending journal pins 15 for bevel-gear wheels 16, which gear wheels are intergeared with a bevel-gear 17 journaled on the shaft 9, the hub-extension 18 of said gear 17, forming a mounting for a gear-pinion 19, meshing with a large gear wheel 20, journaled on the shaft 1, or otherwise suitably supported so that it shall be free to rotate when acted upon with sufficient power by the pinion 19.

Meshing with the gear wheels 16, is a bevel-gear 21, formed with a shaft-extension 22, upon which is keyed a large friction wheel 23, for a purpose which hereinafter appears.

Keyed upon the sleeve-shaft 13, is a bevel-gear 24, meshing with a pair of bevel-gear wheels 25, journaled on radial journal pins 26 secured at their inner ends in shaft 11 and at their outer ends in the ring 27 mounted on and rotatable with shaft 11, in the manner described with respect to ring 14 and shaft 9, and said bevel-gear wheels 25 also mesh with a bevel-gear 28 having a sleeve-extension journaled on sleeve or shaft 11, as shown at 29. A friction wheel 30 is keyed upon sleeve-extension 29, for use when it is desired to drive the gear 20 at its maximum speed or any speed impossible to attain through the control of the friction wheel 23, as will hereinafter appear. Casings for the gearing for effecting acceleration or retardation of speed without change in the speed of the engine, are shown at 31, and similar friction bands 32 and 33 respectively, are fitted around the wheels 23 and 30. In Fig. 2, a lever 34 is shown as mounted upon a suitable support 35, and at opposite sides of its pivotal point the opposite ends of the friction band 32 are attached, the same or an analogous arrangement being provided for the friction wheel 30, though omitted as for a duplicate mechanism. By proper manipulation of the lever 34, the band can be caused to grip the wheel with sufficient power to prevent rotation thereof or to permit same to turn more or less rapidly, the same being true of wheel 30.

Assuming that the shaft 1 is driven but that the car is at rest, it will be apparent that the shifting of the clutch-member 2 into engagement with the clutch-member 4, will transmit power through gears 5 and 8 to shaft 9 in the direction indicated by the arrow (Fig. 4), but that power will have no effect on the car as long as wheel 23 is free to turn without material restraint because the tractional resistance of the wheels of the car will, through gear 17, cause gears 16 carried by ring 14 turning with shaft 9, to turn about their own axes and thereby spin the gear 21 and wheel 23. Gear wheel 24 turning with shaft 13, will cause wheel 30 to spin by causing wheels 25 to turn gear 28.

To start the car after the customary brakes, not shown, are released, the operator will through lever 34 apply the friction band 32 to wheel 23 with gradually increasing force until the retarding power applied to said wheel preponderates over the resistance offered by wheel 17 and thus serves to effect rotation of gear wheels 19 and 20, and hence drive the car. The speed of travel will be increased as the pressure of the band reduces the speed of wheel 23, the arrest of the latter producing maximum speed derived from shaft 9, it being obvious that when the rotation of gear 21 is slower than the planetary travel of gears 16, the revolution of gear 17 will be more rapid than that of shaft 9.

If it be desired to still further increase the speed of travel, the band 32 will be left in its applied position, and the clutch shifted to throw shaft 9 out and shaft 11 in gear with the engine shaft, the band 33 being also applied gently to wheel 30 so that gear 28 shall offer such resistance to gears 25 as to effect rotation thereof around their own axes without affecting the planetary travel of said gears. As a result, gear 24 is driven at a speed equal to such planetary travel plus the speed at which such gears 25 revolve around their own axes, which speed is of course increased proportionately as the speed of wheel 30 is diminished by greater pressure applied thereon through the band.

The ring 14 is driven at the same speed as gear 24, and as the gear 21 is held stationary, the gears 16 are revolved around their own axes, and hence drive gear 17 at a speed equal to that of the said ring plus that of said gears 16 around their own axes. When the pressure of the band 33 is sufficient to arrest wheel 30, the car will be driven at the highest possible speed without acceleration of the engine, the means for controlling the speed of the latter being omitted as forming no part of the invention.

I claim:

1. A variable speed transmission gearing, comprising a driving element, a pair of shafts coaxially arranged, a ring around and rotatable with each of said shafts, a beveled wheel journaled on each ring and disposed with its axis radially of said shafts, a wheel geared to each of said beveled wheels, independent means for retarding or arresting rotation of each of the wheels geared to the beveled wheels, a second wheel meshing with one of the beveled wheels and rotatable with the ring of the other beveled wheel, a second wheel geared to the beveled wheel of the last-mentioned ring, and means for transmitting power from the driving element to either of said shafts.

2. A variable speed transmission gearing, comprising a driving shaft, a pair of shafts coaxially arranged, a ring around and rotatable with each of said shafts, one or more beveled wheels journaled on each ring and disposed with their axes radial of said shafts, a wheel intergeared with the wheel or wheels of each ring, a brake wheel rotatable with each of said wheels intergeared to said beveled wheels, a second wheel intergeared with the beveled wheel or wheels of one of said rings and rotatable with the other ring, a second wheel intergeared with the beveled wheel or wheels of the last-mentioned ring, independent means for applying braking pressure on said brake wheels, selective means for transmitting power from the driving shaft to either of said coaxially arranged shafts, and means for transmitting power from the last-mentioned wheel.

In testimony whereof I affix my signature.

RUSSELL L. DAILEY.